(12) United States Patent
Lee et al.

(10) Patent No.: US 8,820,805 B2
(45) Date of Patent: Sep. 2, 2014

(54) CRASH BOX FOR A VEHICLE

(75) Inventors: Jong Wook Lee, Daejeon (KR); Seung Chang Kim, Daejeon (KR); Choul Won So, Daejeon (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 13/819,143

(22) PCT Filed: Sep. 8, 2011

(86) PCT No.: PCT/KR2011/006675
§ 371 (c)(1),
(2), (4) Date: Feb. 26, 2013

(87) PCT Pub. No.: WO2012/033370
PCT Pub. Date: Mar. 15, 2012

(65) Prior Publication Data
US 2013/0154287 A1 Jun. 20, 2013

(30) Foreign Application Priority Data
Sep. 9, 2010 (KR) ........................ 10-2010-0088364

(51) Int. Cl.
*B60R 19/34* (2006.01)
*B60R 19/03* (2006.01)

(52) U.S. Cl.
CPC *B60R 19/34* (2013.01); *B60R 19/03* (2013.01)
USPC ........................ 293/133; 296/187.03; 188/377

(58) Field of Classification Search
CPC ........ B60R 19/34; B60R 19/02; B60R 19/18; B60R 19/24
USPC ............. 293/133, 132, 154, 155; 296/187.03, 296/187.09, 203.02; 188/371, 377
See application file for complete search history.

(56) References Cited

U.S. PATENT DOCUMENTS

| | | | | |
|---|---|---|---|---|
| 6,174,009 | B1 * | 1/2001 | McKeon | 293/133 |
| 6,971,694 | B2 * | 12/2005 | Sakuma et al. | 293/133 |
| 7,066,509 | B2 * | 6/2006 | Kollaritsch et al. | 293/133 |
| 7,188,877 | B2 * | 3/2007 | Gonzalez et al. | 293/133 |

(Continued)

FOREIGN PATENT DOCUMENTS

| | | |
|---|---|---|
| JP | 2005-162049 A | 6/2005 |
| JP | 2009-154587 A | 7/2009 |
| KR | 10-2007-0055014 A | 5/2007 |
| KR | 10-2007-0055014 A * | 5/2007 |

OTHER PUBLICATIONS

International Search Report for PCT/KR2011/006675 mailed Apr. 4, 2012 from Korean Intellectual Property Office.

*Primary Examiner* — Jason S Morrow
*Assistant Examiner* — E Turner Hicks
(74) *Attorney, Agent, or Firm* — Sherr & Jiang, PLLC

(57) ABSTRACT

Disclosed is the outer support member and the inner support member each have a vertical wall and upper and lower horizontal walls. The vertical walls of the outer support member and inner support member are formed on the outer surfaces of the respective support members. The inner edges of the upper and lower horizontal walls are inclined from the rear portions thereof toward front center portions thereof. Thus, the performance of the crash box of the present invention may satisfy the requirements for both an offset test and a barrier test, reduce the weight of the bumper beam assembly to thereby reduce costs, and improve the performance and fuel efficiency of the vehicle.

6 Claims, 19 Drawing Sheets

(56) References Cited

U.S. PATENT DOCUMENTS

| | | | |
|---|---|---|---|
| 7,360,811 B2 * | 4/2008 | Roll et al. | 293/133 |
| 7,469,956 B2 * | 12/2008 | Yasuhara et al. | 296/187.09 |
| 8,002,338 B2 * | 8/2011 | Yasuhara et al. | 296/203.02 |
| 2009/0001737 A1 * | 1/2009 | Salomonsson | 293/133 |

* cited by examiner

CRASH BOX FOR A VEHICLE

CROSS REFERENCE TO PRIOR APPLICATION

This application is a National Stage Patent Application of PCT International Patent Application No. PCT/KR2011/006675 (filed on Sep. 8, 2011) under 35 U.S.C. §371, which claims priority to Korean Patent Application No. 10-2010-0088364 (filed on Sep. 9, 2010), which are all hereby incorporated by reference in their entirety.

TECHNICAL FIELD

The present invention relates to a crash box for a front or rear bumper beam assembly for a vehicle, and more particularly, to a crash box for a vehicle, the performance of the crash box satisfying the requirements for a low-speed crash test.

BACKGROUND ART

Generally, a bumper for a vehicle needs performance of absorbing an impact while a front or rear of a back panel is colliding to ensure the safety of a rider and reduce a damage of the back panel. Among components of such bumper, a bumper beam assembly performs most important role, the bumper beam assembly includes a bumper beam and a crash box; stay.

A bumper needs to satisfy regulations of a low-speed crash test and articles of a research council for automobile repairs (RCAR) test (hereinafter, referred to as the RCAR test), which are semi-regulations, in which, since performances needed in the RCAR test are stricter than the low-speed crash test, when satisfying the needs, it is understood to naturally satisfy the regulations of the low-speed test.

In a general RCAR test, a low-speed crash test (hereinafter, referred to as an offset test; and refer to FIGS. 1A and 1B) is executed at a speed of 15 km/h with a degree of 10° toward a wall offset by 40% and the performance of a bumper is measured by calculating a repair cost for a damage of a back panel and determining an insurance grade. The performance needed in the offset test is replacing only the bumper with no damage of the back panel. A crash box 200 satisfying the performance needed in the offset test is generally formed in a shape shown in FIG. 2A, and a configuration of a bumper beam assembly 200' using the same is as shown in FIG. 2B. That is, a configuration capable of absorbing impact energy as much as possible by using compression and deformation within a limit that a bumper beam 150 endures to reduce the damage of the back panel in a collision includes a front plate member 210, a rear plate member 220, an outer support member 230, and an inner support member 240 and reduces the damage of the back panel by absorbing the impact energy by using compression and deformation of the outer and inner support members 230 and 240 in a collision as shown in FIG. 3.

However, in a recently changed RCAR test, in addition to the traditional offset test, a low-speed crash test (hereinafter, referred to as a barrier test; and refer to FIGS. 4A and 4B) is executed on a front and a rear of a vehicle at a speed of 10 km/h with a bumper dummy barrier whose height is 18 inches. The performance needed in the barrier test is being with no damage of a back panel and with no occurrence of under ride and over ride. That is, to satisfy the needs of the barrier test, a crash box and a bumper beam maintain suitable strength and reduce deformation to prevent the damage of the back panel.

It is difficult to satisfy the performances needed in the offset test and barrier test of the changed RCAR test, contrary to each other, as described above, which is more difficult in reality in which a limitation is in weight and a cost price and fuel efficiency need to be considered.

Hereupon, to increase the strength of a configuration of the crash box 200 of FIG. 2A, there is disclosed a crash box 300 as shown in FIG. 5A. That is, to satisfy the performance needed in the barrier test, a front part of the inner support member 340 is broaden to a center part of the bumper beam 150 in such a way that strength is increased to prevent a damage of a back panel 170 in a collision (refer to FIG. 5B). However, as shown in FIG. 17, when executing the offset test, the back panel 170 is largely damaged. To satisfy the performances needed in the contrary tests, the shape of the crash box 300 is changed with the inner support member 340 being broaden and a disadvantageous condition such as a weight increase, which causes a decrease in performance thereof.

Accordingly, a shape of a crash box to satisfy the performances needed in the contrary tests is necessary.

DISCLOSURE OF THE INVENTION

Technical Problem

The present invention provides a crash box for an automobile, the crash box having a new shape capable of satisfying contrary performances needed in an offset test and a barrier test according to a changed research council for automobile repairs (RCAR) test at the same.

Technical Solution (1) According to an aspect of the present invention, there is provided a crash box for an automobile. The crash box includes a front plate member connected to a bumper beam, a rear plate member connected to a member, an outer support member connecting the front plate member and the rear plate member to each other, and an inner support member connecting the front plate member and the rear plate member to each other and adjacent to the outer support member. In the case of the outer support member and the inner support member in the crash box for the automobile including a vertical wall and upper and lower horizontal walls, the vertical wall is formed on an outer part of the outer support member, and the vertical wall is formed on an outer part of the inner support member and inner corner parts of the upper and lower horizontal walls are inclined in a direction from a rear to a frontal center part.

(2) In the crash box (1), the member and the inner and outer support members may have the same cross-sections of parts connected to the rear plate member and folded.

(3) In the crash box (1), the vertical wall of the inner support member may include one or more creases formed in a vertical direction.

(4) In the crash box (1), the inner support member may include a groove formed between a vertical wall connecting part and a horizontal wall connecting part connected to the front plate member.

(5) In the crash box (1), the inner support member may include flanges formed upwardly on an inner corner part of the upper horizontal wall and formed downwardly on an inner corner part of the lower horizontal wall.

(6) In the crash box (1), the inclination may be 15 to 60° based on a front and rear axis.

(7) In the crash box (1), the vertical wall of the outer support member may include one or more creases formed in a vertical direction.

(8) In the crash box (1), the outer support member may include a groove formed between a vertical wall connecting part and a horizontal wall connecting part connected to the front plate member.

(9) In the crash box (1), the front plate member may include one or more creases formed inside in a vertical direction.

Advantageous Effects

A crash box for an automobile according to the present invention may be well compressed and deformed and support a greater impact force than general crash boxes by improving a shape of an inner support member to have ideal impact energy efficiency in such a way that performances needed in an offset test and a barrier test are satisfied at the same time, a weight of a bumper beam assembly is reduced to reduce a cost price, and the performance and fuel efficiency of the automobile are improved.

Figure 1A:
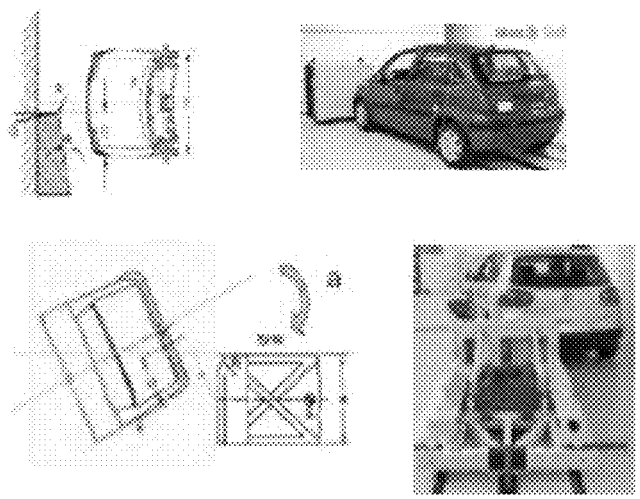
FIGS. 1A and 1B are pictures and a top view illustrating an offset test.
Figure 1B:
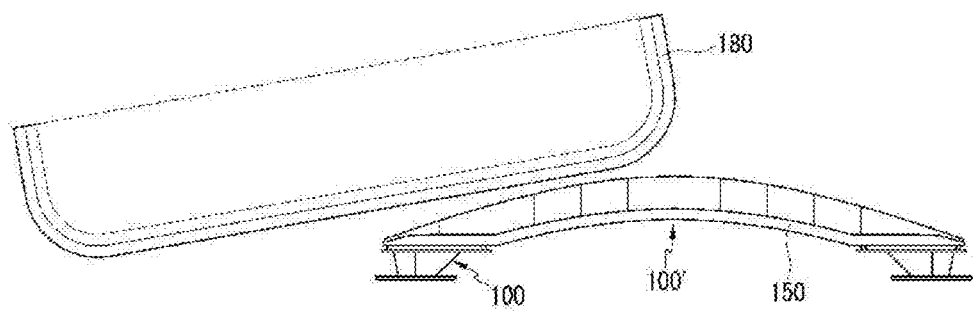
Figure 2A:
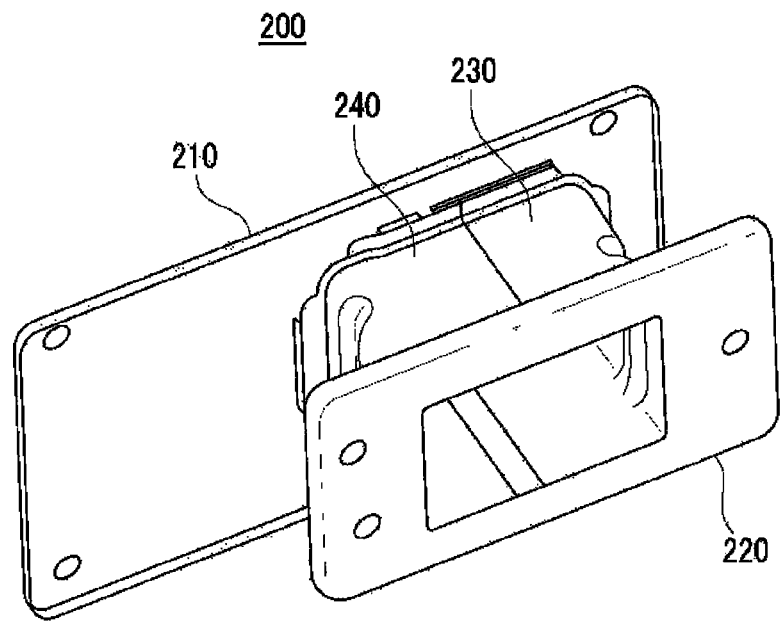
FIGS. 2A and 2B are a perspective view illustrating a general crash box and a top view illustrating a bumper beam assembly.
Figure 2B:
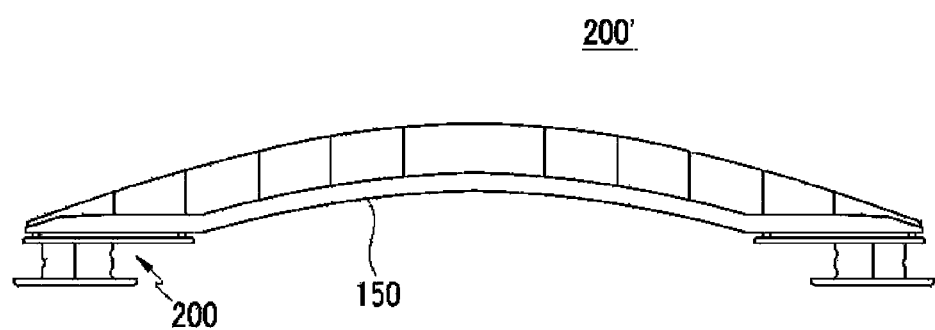
Figure 3:
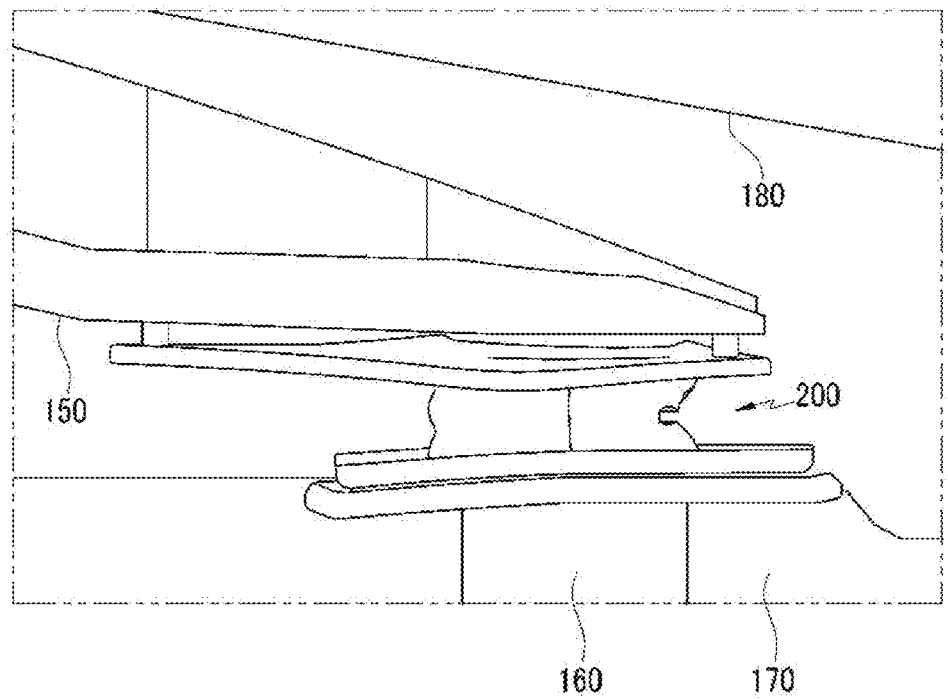
FIG. 3 is a top view illustrating a result of executing an offset test using the bumper beam assembly of FIG. 2B.
Figure 4A:
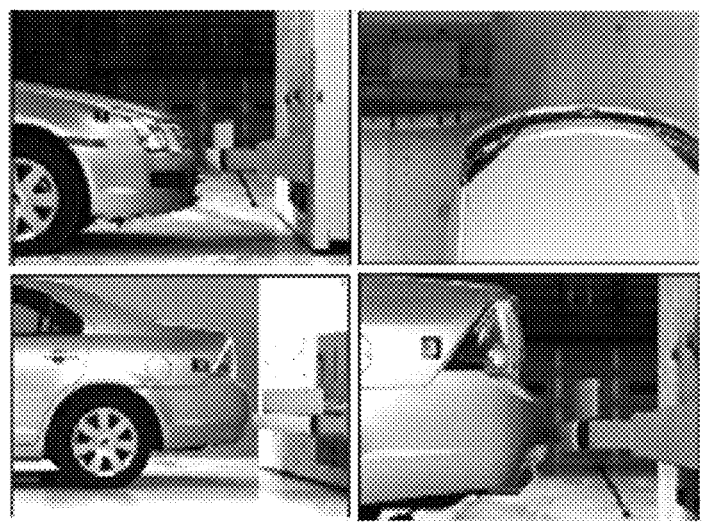
FIGS. 4A and 4B are pictures and a top view illustrating a barrier test.
Figure 4B:
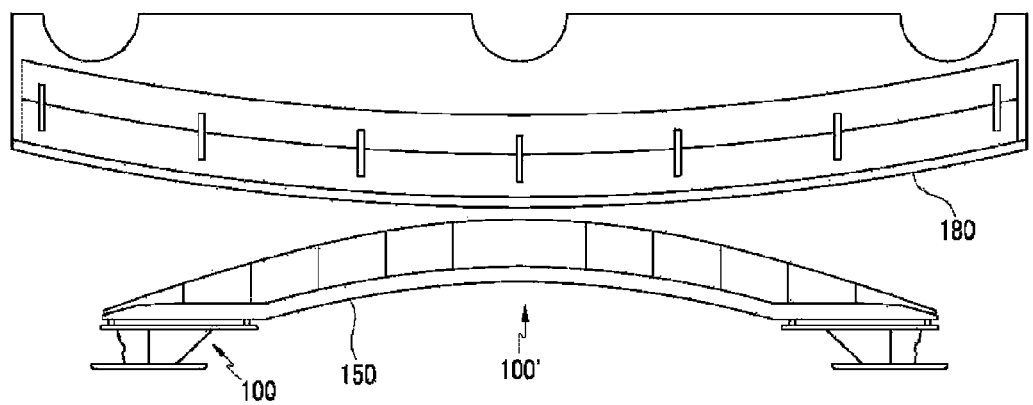

| *Description of reference numerals in the drawings* | |
|---|---|
| 100: a crash box | 110: a front plate member |
| 120: a rear plate member | 130: an outer support member |
| 140: an inner support member | 147: a groove |
| 141: a vertical wall | 160: a member |
| 142: upper and lower horizontal walls | 180 an impingement device |
| 143: a corner part | |
| 144: one or more creases | |
| 150: a bumper beam | |
| 170: a back panel | |

MODE FOR CARRYING OUT THE INVENTION

Hereinafter, the exemplary embodiments of the present invention will be described with reference to the drawings.

In the drawings, like reference numerals designate like elements throughout and front, rear, top, bottom, inner, and outer directions of a crash box 100 are as shown in the drawings. Also, throughout the specification, when a part "includes" a component, if there is no particular mention, it does not mean to exclude another component but means to be capable of further including another component.

Figure 6A:
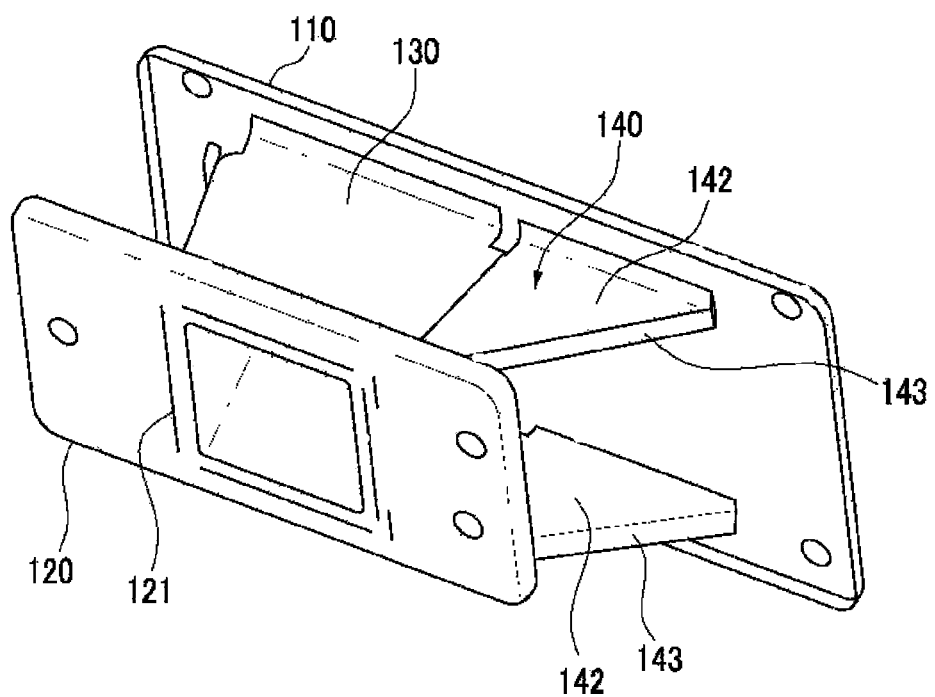
FIGS. 6A and 6B are a perspective view illustrating a crash box according to an embodiment of the present invention and a top view illustrating a bumper beam assembly according to an embodiment of the present invention.
Figure 6B:
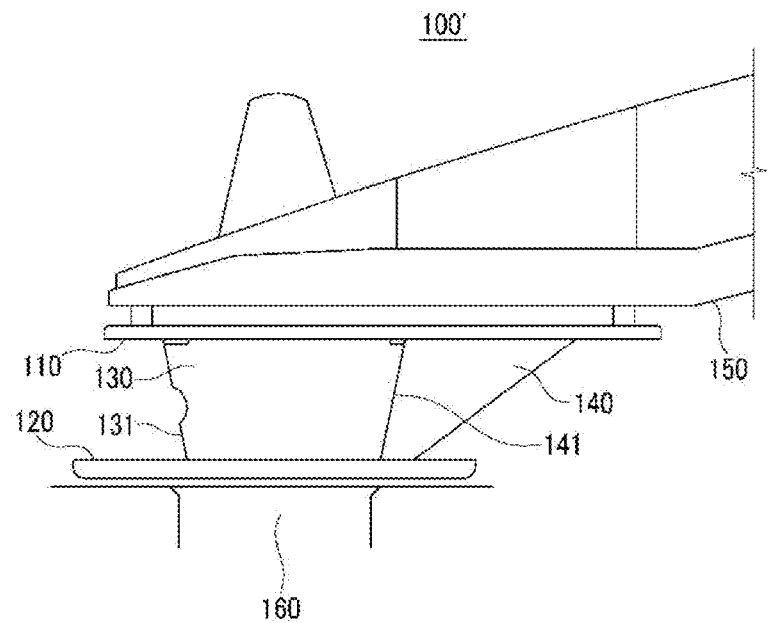
Figure 7:
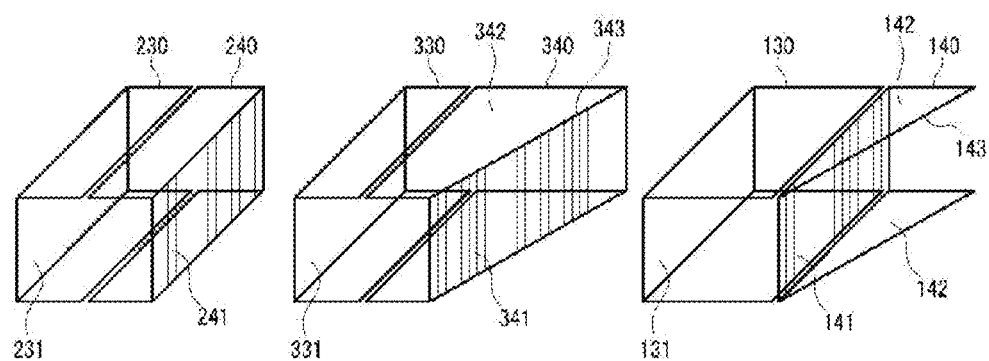
FIG. 7 is a mimic view comparatively illustrating the crash boxes for automobiles according to the related art and an embodiment of the present invention, respectively.

FIG. 6A is a perspective view illustrating the crash box 100 according to an embodiment of the present invention, and FIG. 6B is a top view illustrating a bumper beam assembly with the crash box 100 of FIG. 6A attached;

FIG. 7 is a mimic view comparatively illustrating configurations of crash boxes for automobiles according to the related art and an embodiment of the present invention, respectively.

Referring to FIGS. 6A and 6B, the crash box 100 for an automobile includes a front plate member 110, a rear plate member 120, an outer support member 130, and an inner support member 140. Referring to FIG. 7, there are shown shapes of a crash box 200 for satisfying performance of needed in a traditional offset test (a), a crash box 300 for satisfying performance needed in a traditional barrier test (b), and the crash box 100 according to the present embodiment (c).

The front plate member 110 may be connected to a bumper beam 150 screwed on a front thereof and may be connected to the outer support member 130 and the inner support member 140 welded onto a rear thereof. Also, the rear plate member 120 may be connected to a member 160 screwed onto a rear thereof and may be connected to the outer support member 130 and the inner support member 140 inserted into a corresponding slit 121 formed on a front of the rear plate member 120.

In this case, the outer support member 130 and the inner support member 140 may be adjacent to each other and closely attached or separate from each other with a certain interval but may be closely attached to each other.

Also, the outer support member 130 and the inner support member 140 are in ⊂ shapes in front and rear views. That is, single vertical walls 131 and 141 supporting the front and rear plate members 110 and 120 formed of surfaces in a vertical direction and two pairs of two horizontal walls 132 and 142 supporting the front and rear plate members 110 and 120 formed of surfaces in a lateral direction are formed in single bodies to be in the ⊂ shapes. That is, the vertical wall 141 of the inner support member 140, located on an outer part, is different from that a vertical wall 341 of a general inner support member 340, located in an inner part, which allows the vertical wall 141 of the inner support member 140 to be in accordance with the member 160 in front and rear directions. In other words, to reduce an impingement of an impingement device 180 in a traditional barrier test, an inner corner part 343 of a vertical horizontal wall 342 is inclined in a direction from a rear toward a frontal center part to broaden a range of supporting a bumper beam 350 and increase strength of the bumper beam 350, thereby satisfying the needed performance. However, since due to an increase of a weight of the crash box 300 and a shape of being located close to the center part, impact energy absorbing efficiency decreases in an offset test and a damage of a back panel 370 of a back panel is caused. Accordingly, the vertical wall 141 of the inner support member 140 is located in the outer part, thereby improving impact energy absorbing efficiency in a collision in such a way that a damage of a back panel 170 may be prevented and the weight of the crash box 100 may be reduced according to the improvement of the impact energy absorbing efficiency.

Figure 11:
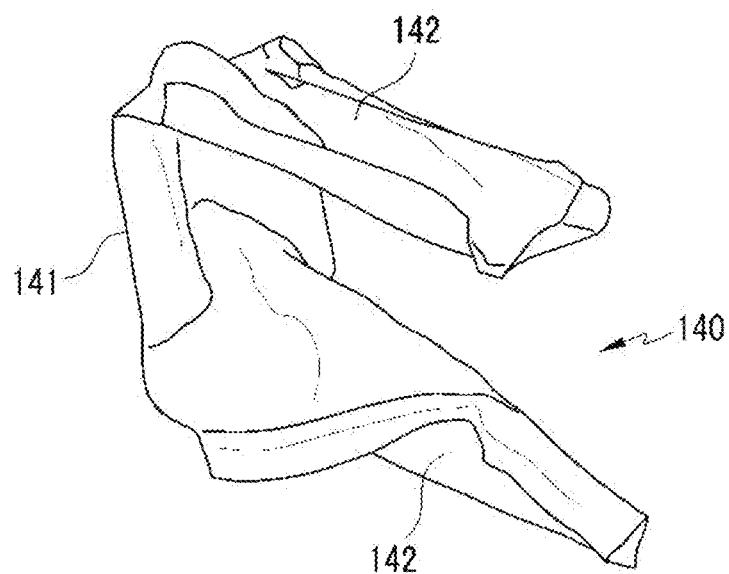
FIG. 11 is a perspective view illustrating a result of executing an offset test using the inner support member according to the present embodiment.

In this case, an inclination angle of a corner part 143 inside a vertical horizontal wall inclined in a direction from a rear toward a frontal center part may be 15 to 60°, and more particularly, be 30 to 45°, based on a front and rear axis. When the inclination angle is less than 15°, it is difficult to satisfy the strength of the bumper beam needed in a barrier test. When the inclination angle is more than 60°, there are loads on the weight and a cost price due to an increase of an area of the horizontal walls 142 and there are fears a back panel may be damaged because compression and deformation of the horizontal walls 142 do not occur in a direction from the inside to the outside in a collision (refer to FIG. 11).

Figure 8A:
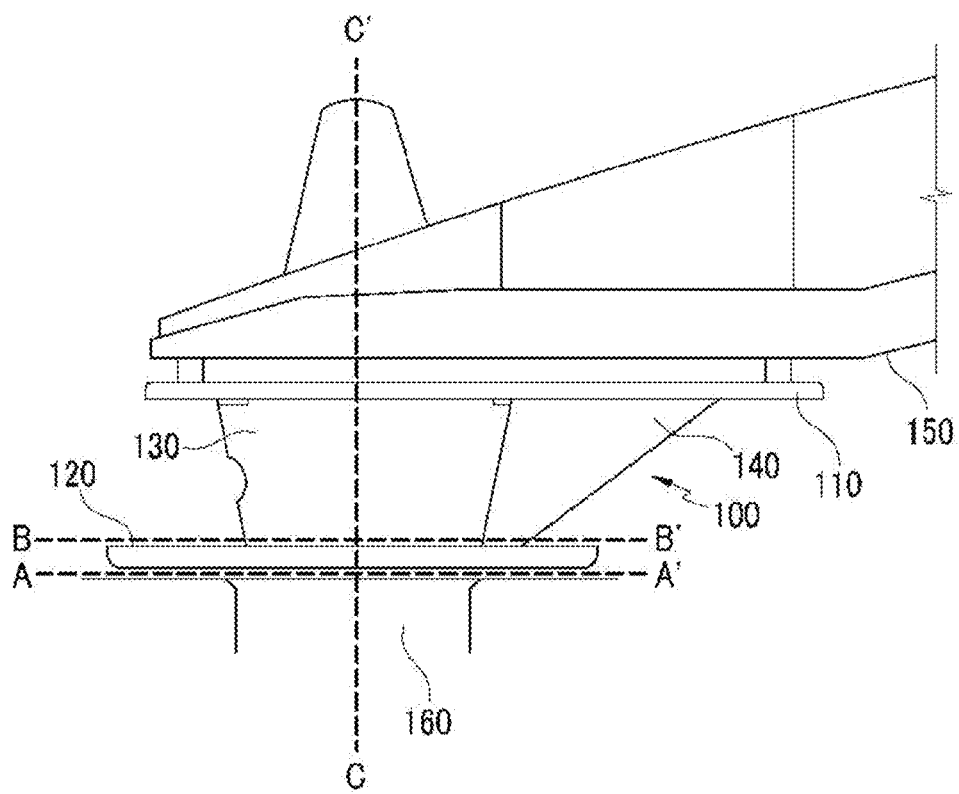
FIG. 8A is a top view illustrating the crash box according to the present embodiment.
Figure 8B:
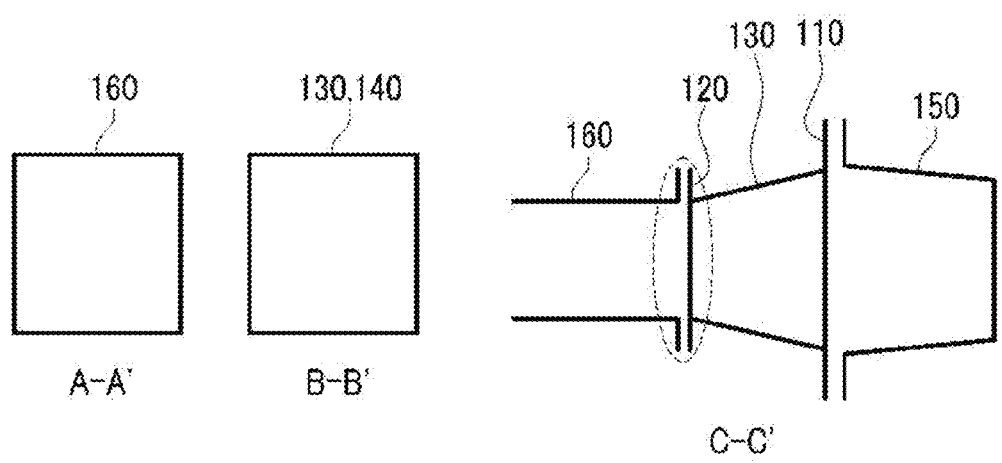
FIG. 8B illustrates cross-sections cut along a line A-A', a line B-B', and a line C-C' of FIG. 8A, respectively.

FIG. 8A is a top view illustrating the crash box 100 according to the present embodiment, and FIG. 8B illustrates cross-sections of the crash box 100 cut along a line A-A', a line B-B', and a line C-C' of FIG. 8A, respectively.

Referring to FIGS. 8A and 8B, in the case of the crash box 100 for an automobile, parts folded and connected to the member 160 and the rear plate member 120 of the outer and inner support members 130 and 140 may have the same cross-sections. When the cross-sections are not the same, it is impossible to properly support the bumper beam 150 and the back panel 170 may be damaged because the crash box 100 surrounds the member 160 and overturns in a collision.

Figure 9A:
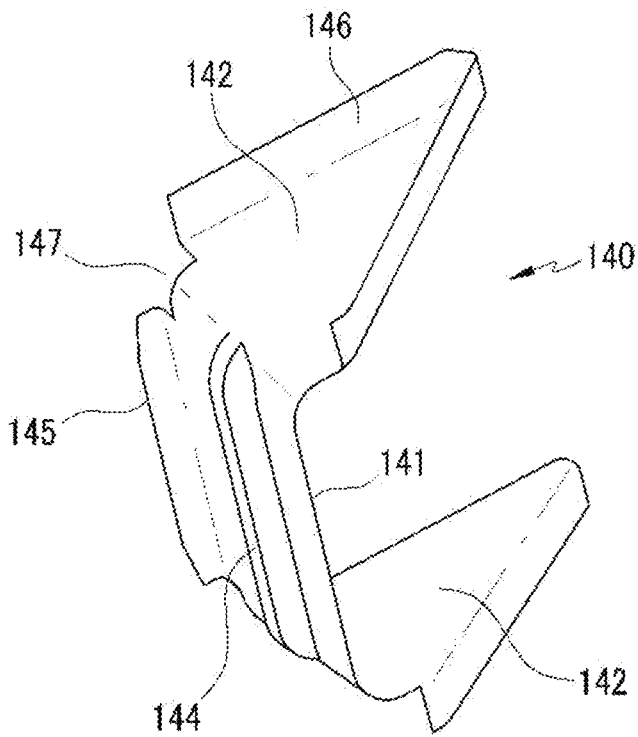
FIGS. 9A to 9C are a perspective view, a top view, and a left-side view illustrating an inner support member according to the present embodiment.
Figure 9B:
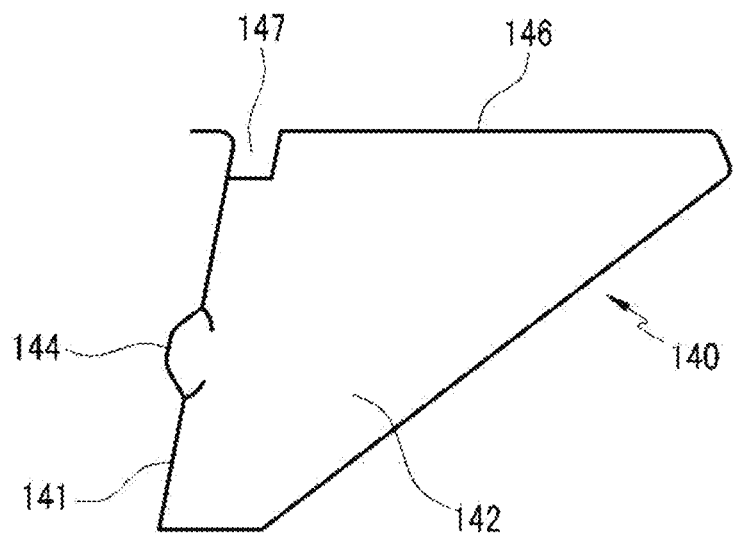
Figure 9C:
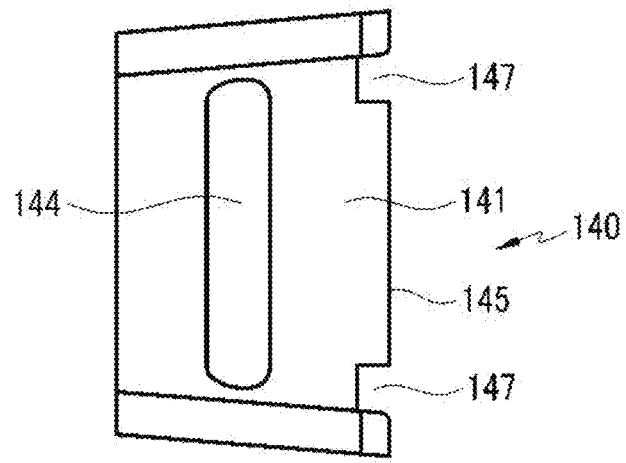

FIGS. 9A to 9C are a perspective view, a top view, and a left-side view illustrating the inner support member 140 according to the present embodiment.

Referring to FIGS. 9A to 9C, the vertical wall 141 of the inner support member 140 may have one or more creases 144 formed in a vertical direction. The creases 144 may allow the crash box 100 to be uniformly compressed and deformed in a collision to provide the ideal impact energy absorbing efficiency. Considering the impact energy absorbing efficiency, the creases 144 may be formed to be convex outward. Also, a groove 147 may be formed between a vertical wall connecting part 145 and a horizontal wall connecting part 146 connected to the front plate member 110. The groove 147 induces initial deformation in a collision to prevent that an impact more than permissible strength is transferred to the member 160 because the deformation of the crash box 100 does not start in the early stage of the collision.

Figure 10:
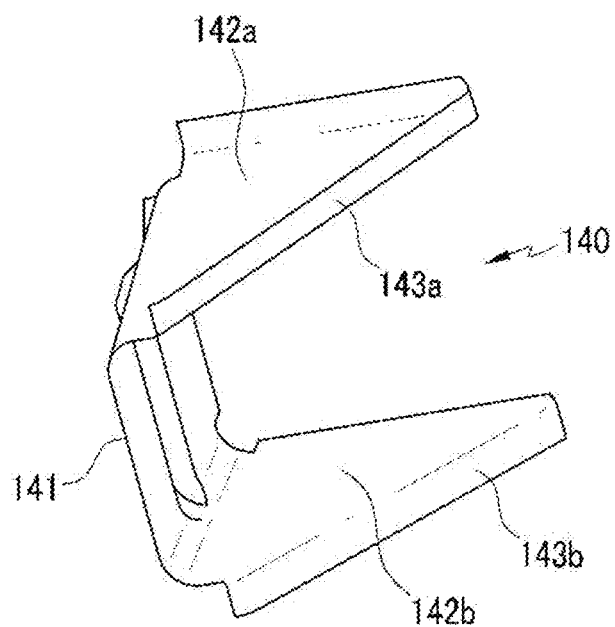
FIG. 10 is another perspective view illustrating the inner support member according to the present embodiment.

FIG. 10 is another perspective view illustrating the inner support member 140.

Referring to FIG. 10, in the case of the upper and lower horizontal walls 142 of the inner support member 140, flanges 143' are formed upwardly on an inner corner part 143a of an upper horizontal wall 142a and formed downwardly on an inner corner part 143b of a lower horizontal wall 142b, respectively.

Deformation having no effect on the back panel 170 in a collision may be induced by the shape of the flanges 143'. That is, the deformation of the horizontal walls 142 is induced from the inside to the outside in such a way that there is no effect on the back panel 170 in the collision (refer to FIG. 11). Also, due to the shape of the flanges 143', a supporting force increases in such a way that not only the weight of the crash box 100 but also a weight of the bumper beam 150 may be reduced.

Figure 12A:
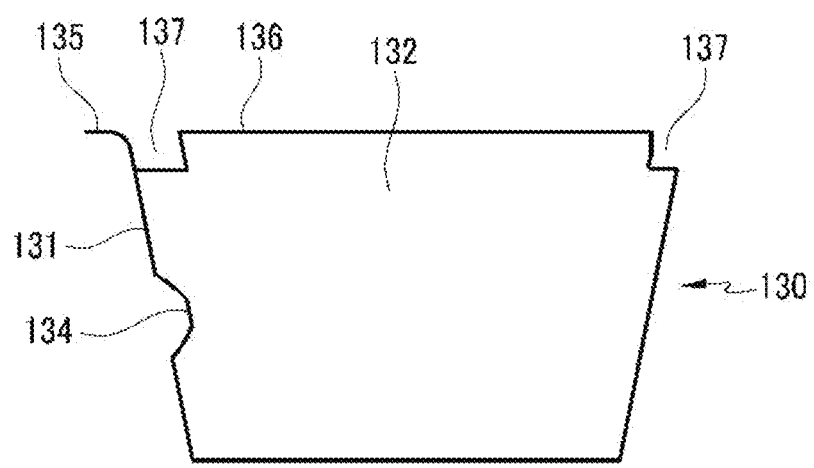
FIGS. 12A and 12B are a top view and a left-side view illustrating an outer support member according to an embodiment of the present invention.
Figure 12B:
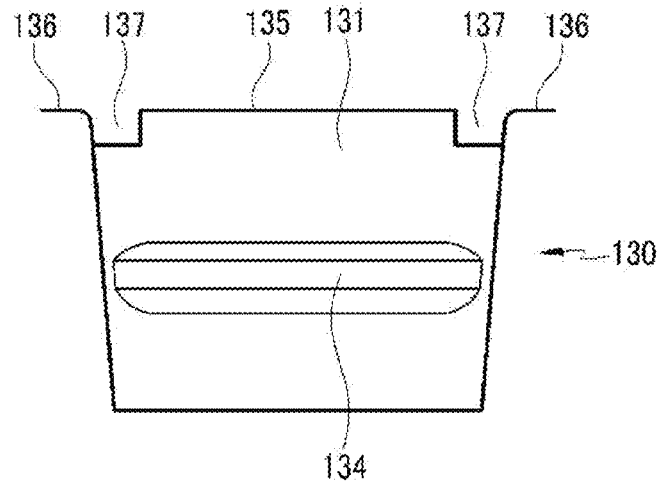

FIGS. 12A and 12B are a top view and a left side view illustrating the outer support member 130.

Referring to FIGS. 12A and 12B, the vertical wall 131 of the outer support member 130 may have one or more creases 134 formed in a vertical direction. The creases 134 may allow the crash box 100 to be uniformly compressed and deformed in a collision to provide the ideal impact energy absorbing efficiency. Considering the impact energy absorbing efficiency, the creases 134 may be formed to be convex outward. Also, a groove 137 may be formed between a vertical wall connecting part 135 and a horizontal wall connecting part 136 connected to the front plate member 110. The groove 137 induces initial deformation in a collision to prevent that an impact more than permissible strength is transferred to the member 160 because the deformation of the crash box 100 does not start in the early stage of the collision.

Figure 13A:
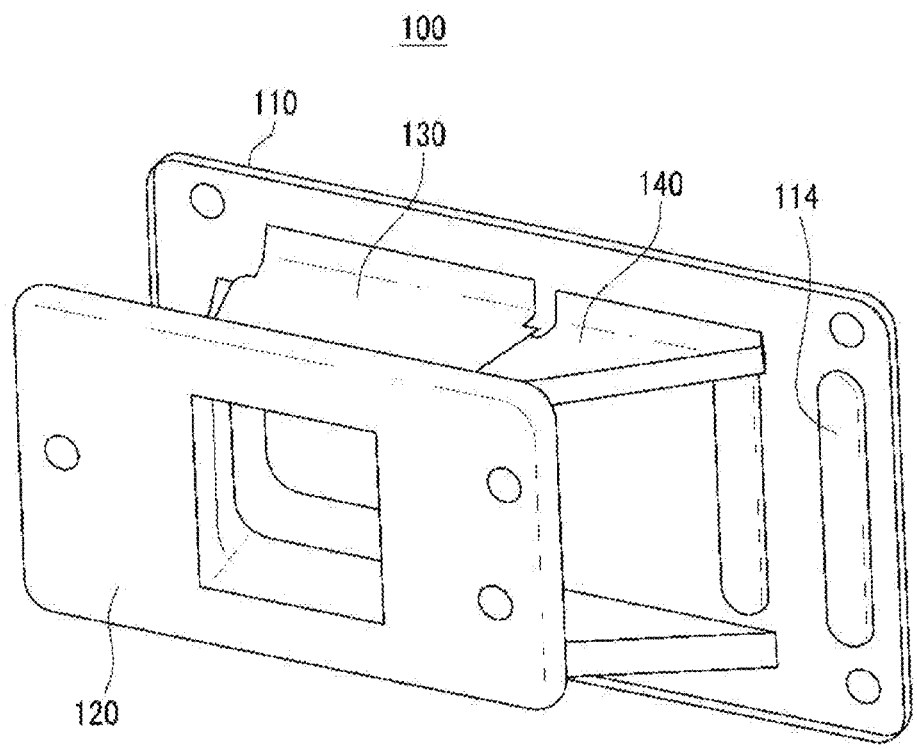
FIG. 13A is a perspective view illustrating another example of the crash box according to the present embodiment.
Figure 13B:
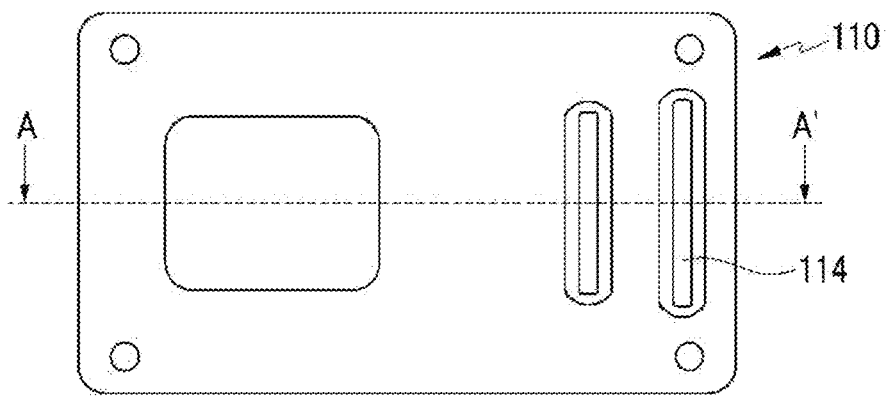
FIGS. 13B and 13C are a front view illustrating a front plate member of FIG. 13A and a cross-sectional view illustrating the front plate member cut along a line A-A'.
Figure 13C:
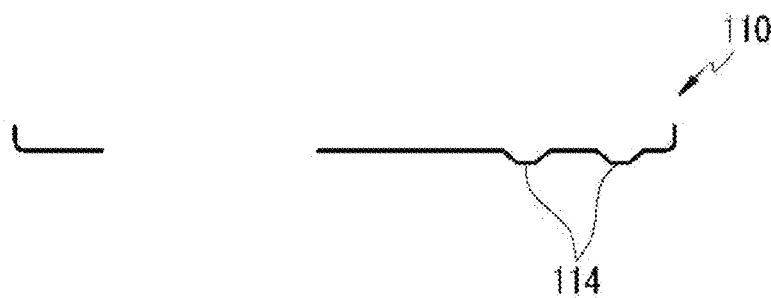

FIG. 13A is a perspective view illustrating another example of the crash box 100, and FIGS. 13B and 13C are a top view illustrating the front plate member 110 of FIG. 13A and a cross-sectional view illustrating the front plate member cut along a line A-A'.

Referring to FIGS. 13A to 13C, the front plate member 110 may have one or more creases 114 internally in a vertical direction. The creases 114 is for allowing the crash box 100 to be uniformly compressed and deformed in front and rear and for preventing being folded inward.

Figure 14A:
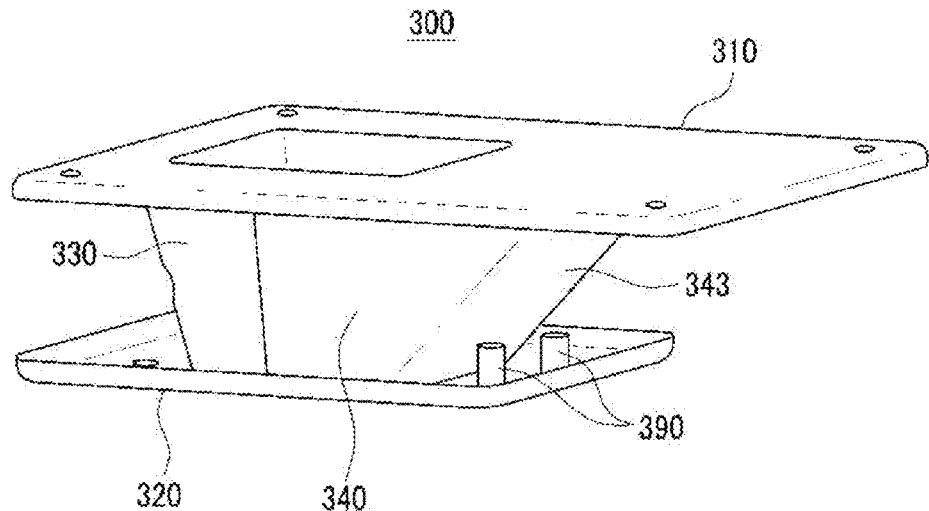
FIGS. 14A and 14B are a perspective view and a top view illustrating a member, a rear plate member, and inner and outer support members of the general crash box.
Figure 14B:
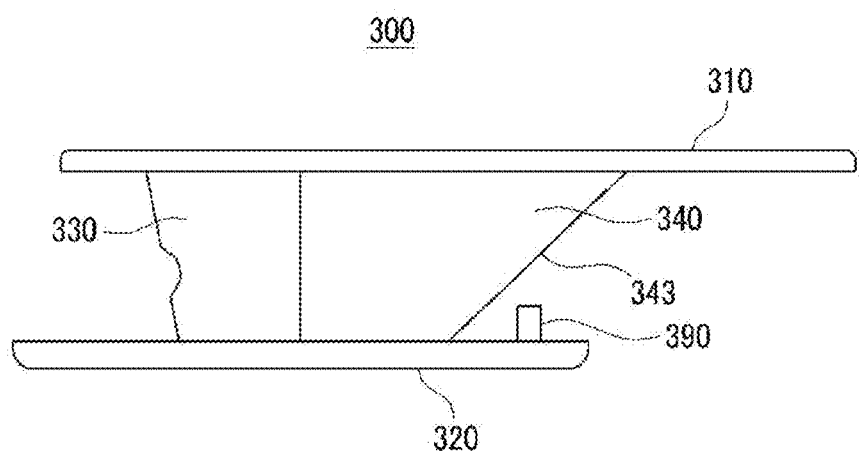

FIGS. 14A and 14B are a perspective view and a top view illustrating a member, a rear plate member 320, and inner and outer support members 340 and 330 of the general crash box 300.

Referring to FIGS. 14A and 14B, to satisfy the performance needed in the barrier test, it is necessary for the general crash box 300 to broaden the inner support member 340 toward the center part of the bumper beam 150, in which a limit is present because an interference is caused by an engagement screw 390 of an inclined plane 343. Also, in the collision, due to the engagement screw 390, a degree of compression is small in such a way that impact energy is not well absorbed, and due to deformation of the inner support member 340, the engagement screw 390 becomes in contact and receives a force, thereby causing a damage of the back panel 170. On the contrary, in the case of the crash box 100, since the vertical wall 141 of the inner support member 140 is formed on an outer part, there is not formed the inclined plane 343 not as the general crash box 300 in such a way that the interference caused by an engagement screw 190 does not occur and the back panel 170 is not damaged by the engagement screw 190 while being compressed and deformed in a collision.

On the other hand, generally, as a material of a bumper beam, steel, glass fiber mat reinforced thermoplastic (GMT), woven long fiber thermoplastic (WLFT) are used. A WLFT bumper beam has performance similar to other bumper beams, but the development of crash boxes suitable for the WLFT bumper beam is inadequate. The crash box 100 may be particularly proper to the WLFT bumper beam.

Embodiment 1

The outer support member 130 and the inner support member 140 are welding-connected the front plate member 110 and inserted into the slit 121 of the rear plate member 120 opposite thereto, thereby preparing the crash box 100. In this case, the creases 134 formed to be convex inward in a vertical direction in the middle of the vertical wall 131 of the outer support member 130, and the groove 137 is formed between the vertical wall connecting part 135 and the horizontal wall connecting part 136 connected to the front plate member 110, on an inner end of the horizontal wall 132. Also, in the case of the inner support member 140, the vertical wall 141 having the creases 144 formed to be convex inward in a vertical direction in the middle thereof is formed of an outer part, the groove 147 is formed between the vertical wall connecting part 145 and the horizontal wall connecting part 146 connected to the front plate member 110, and the upper and lower horizontal walls 142 form the flanges 143' upwardly on the upper horizontal wall 142a and downwardly on the lower horizontal wall 142b to be inclined by 45° in a direction from a rear toward a frontal center part. Also, the two creases 114 are formed in a vertical direction inside the front plate member 110. Also, the cross-sections of the parts of the inner and outer support members 140 and 130 of the prepared crash box 100, connected to the rear plate member 120 and folded, are formed to be in accordance with the cross-section of the member 160. The front plate member 110 is screw-connected to the WLFT bumper beam 150 and the rear plate member 120 is screw-connected to the member 160 by using the prepared crash box 100, thereby perfecting a bumper beam assembly 100' (refer to FIGS. 6A and 6B).

Figure 15:
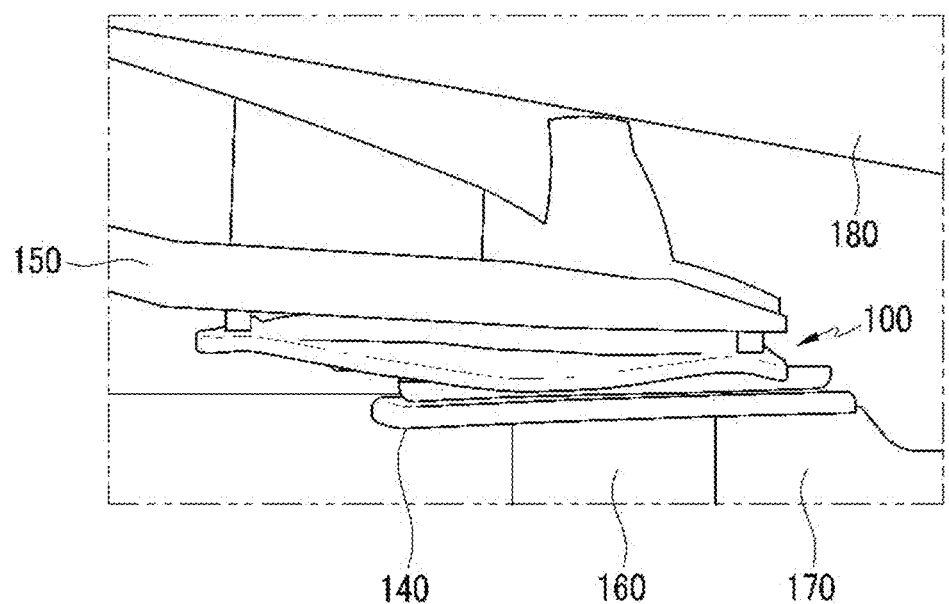
FIG. 15 is a top view illustrating a result of executing an offset test using Embodiment 1.
Figure 16A:
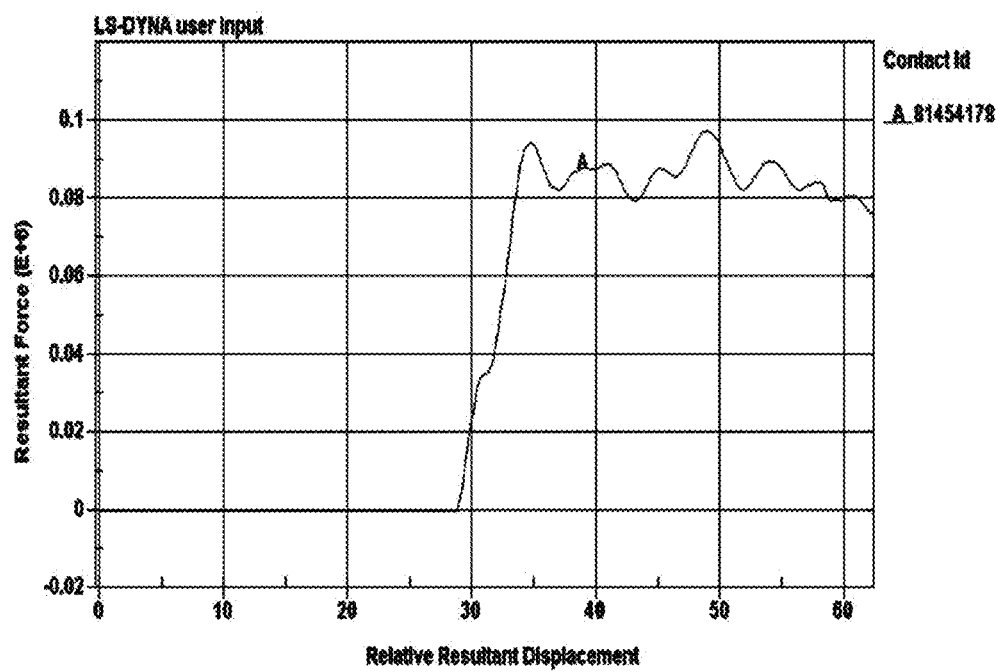
FIGS. 16A to 16D are graphs illustrating F-D curves related impact energy absorbing amount while executing offset tests using the crash boxes according to the embodiments and a comparative example.

After that, an offset test is executed, a compression and deformation state of the crash box 100 is shown in FIG. 15, and an F-D curve related to an impact energy absorbing amount is shown in FIG. 16A.

Embodiment 2

Except for forming the respective grooves 137 and 147 of the outer support member 130 and the inner support member 140, the crash box 100 is prepared to be in the same shape as that of Embodiment 1 and the bumper beam assembly 100' is perfected.

Figure 16B:
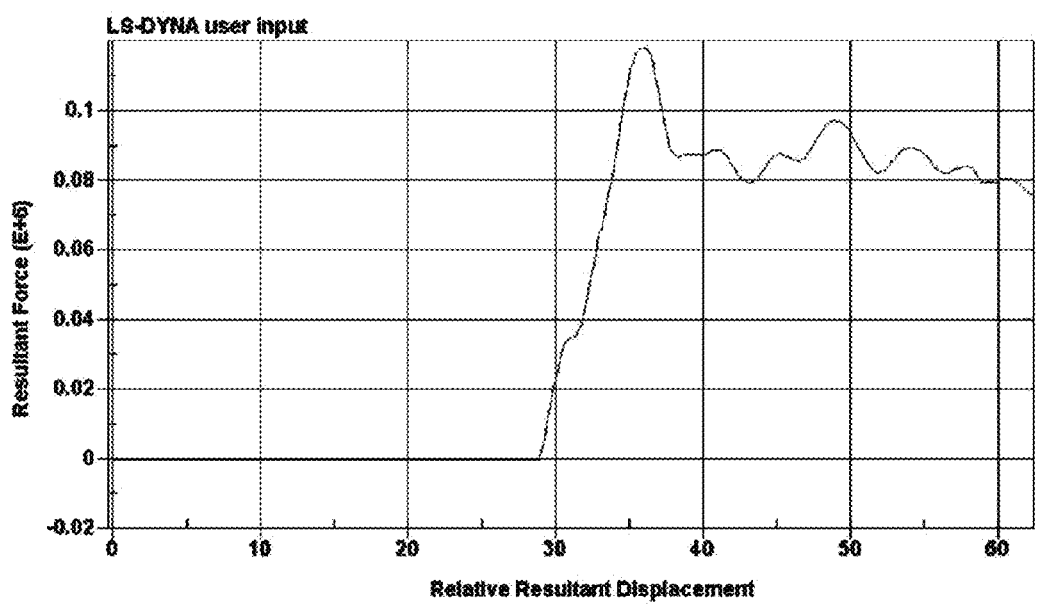

After that, an offset test is executed, and an F-D curve related to an impact energy absorbing amount of the crash box 100 is shown in FIG. 16B.

Embodiment 3

Except for forming the creases 134 and 144 on the vertical walls 131 and 132 of the outer support member 130 and the inner support member 140, the crash box 100 is prepared to be in the same shape as that of Embodiment 1 and the bumper beam assembly 100' is perfected.

Figure 16C:
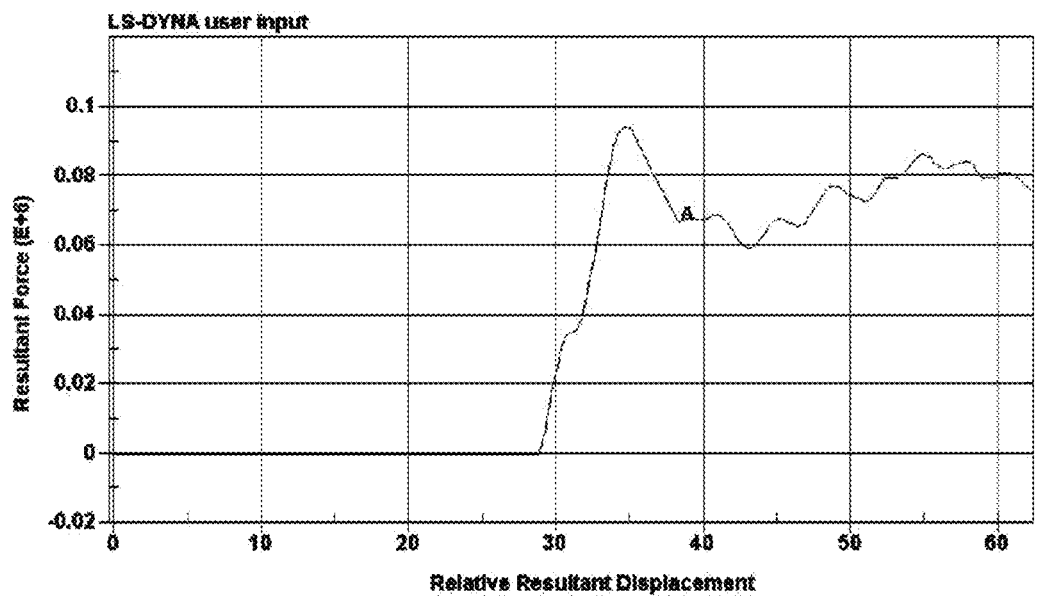

After that, an offset test is executed, and an F-D curve related to an impact energy absorbing amount of the crash box 100 is shown in FIG. 16C.

COMPARATIVE EXAMPLE

Figure 5A:
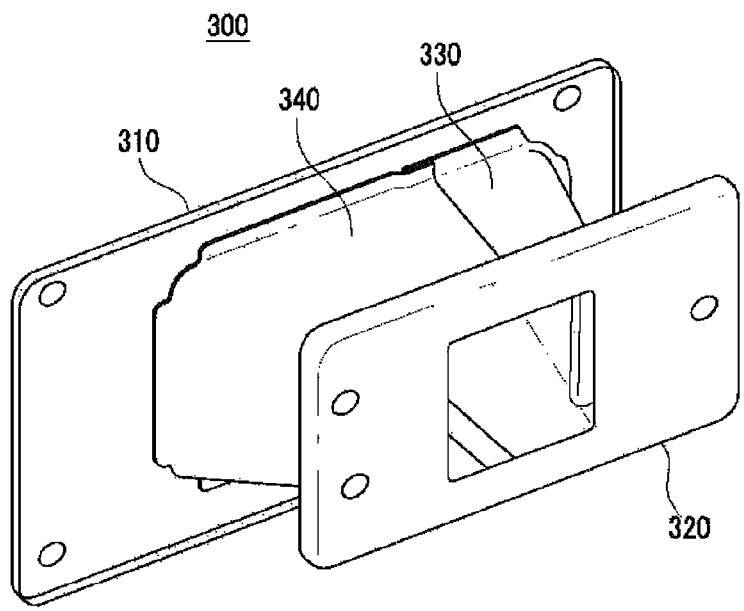
FIGS. 5A and 5B are a perspective view illustrating another general crash box and a top view illustrating another bumper beam assembly.
Figure 5B:
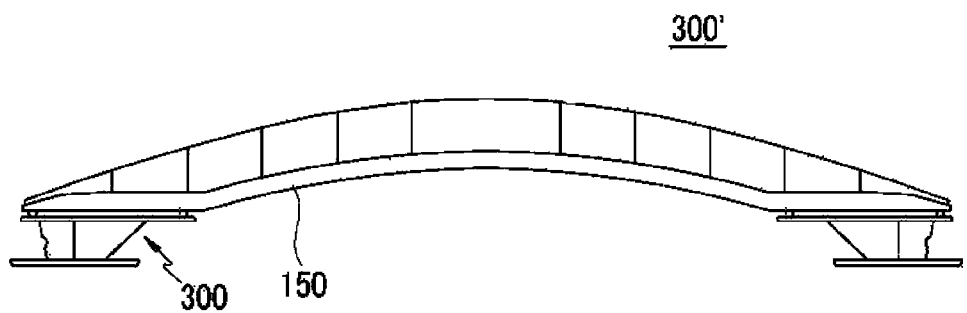

The crash box 300 having the general shape is prepared, and a bumper beam assembly 300' is perfected (refer to FIGS. 5A and 5B).

Figure 16D:
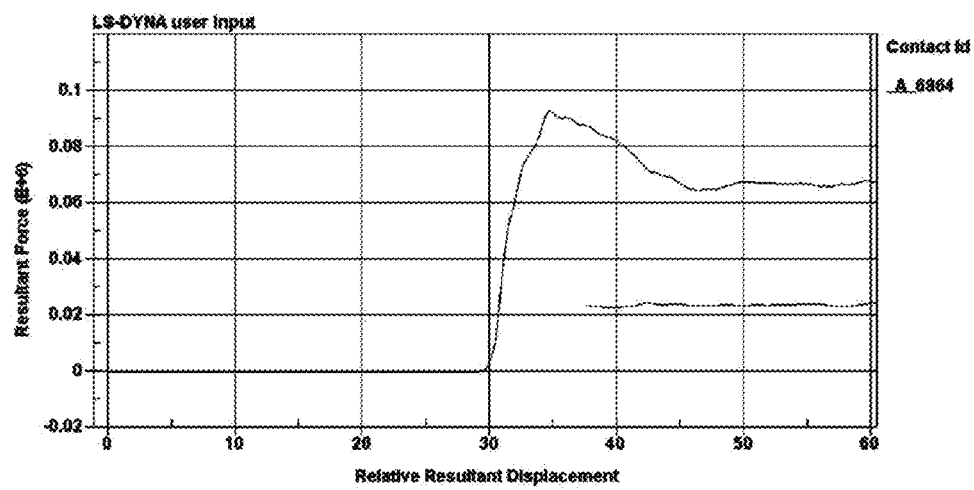
Figure 17:
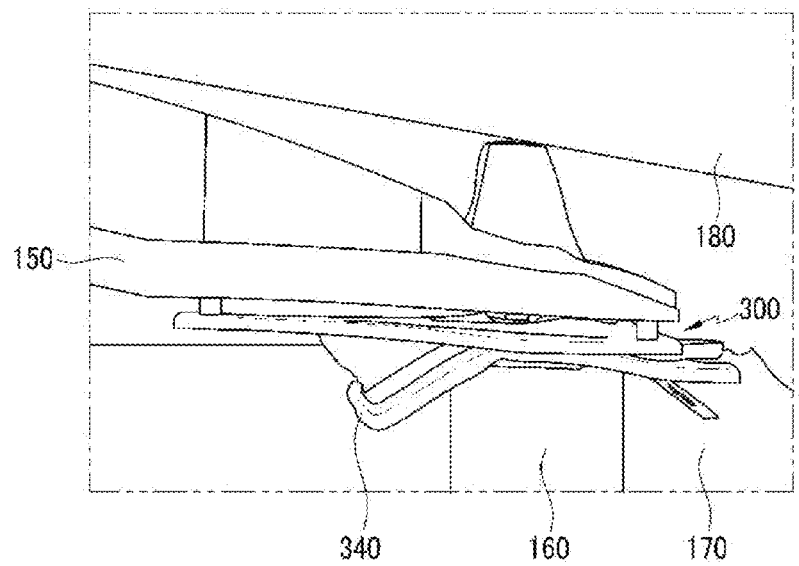
FIG. 17 is a top view illustrating a result of executing an offset test using a comparative example.

After that, an offset test is executed, a compression and deformation state of the crash box 300 is shown in FIG. 17, and an F-D curve related to an impact energy absorbing amount is shown in FIG. 16D.

Figure 16E:
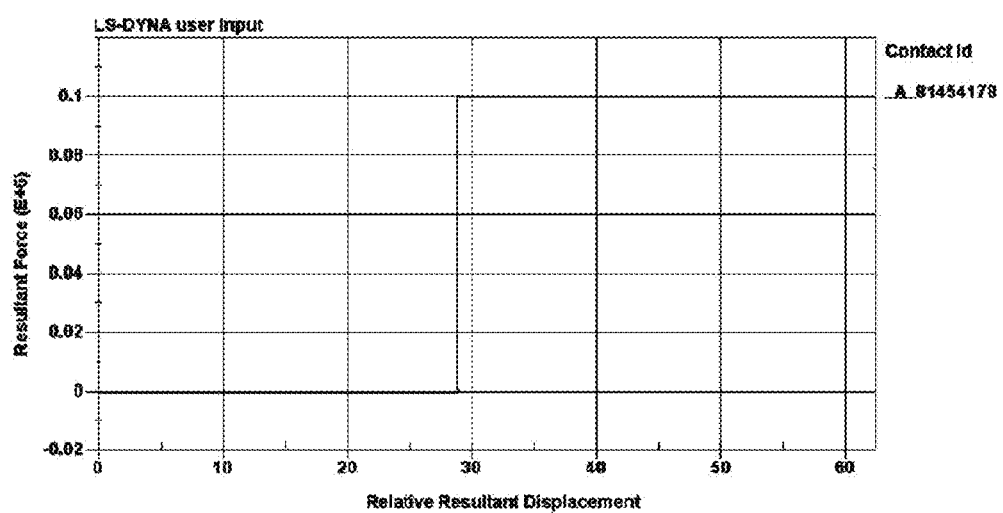
FIG. 16E is a graph illustrating an F-D curve related to an ideal impact energy absorbing amount while executing an offset test.
Figure 18:
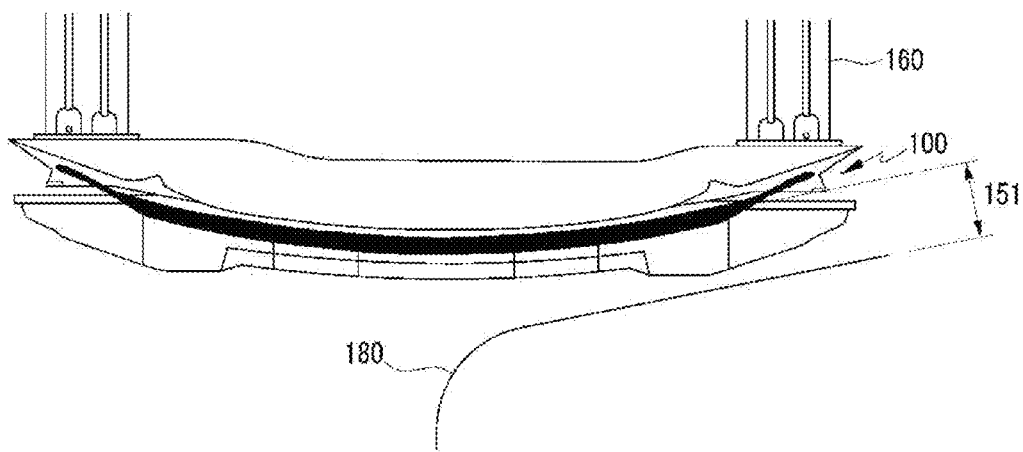
FIG. 18 is a top view illustrating a permissible impingement amount of the bumper beam.

The F-D curves of FIGS. 16A to 16D show member-applied forces according to a permissible impingement amount of the bumper beam 150, respectively. The permissible impingement amount 151 (refer to FIG. 18) of the bumper beam 150 is about 60 mm, and permissible strength of the member 160 is about 100 kN. To satisfy the performance needed in the offset test, the force applied to the member (160) is not over than the permissible strength 100 kN while compressing and deforming the crash box 100 and a damage of the back panel 170 is reduced when over the permissible impingement amount 151 (60 mm). Accordingly, it is ideal to form an F-D curve capable of absorbing impact energy to the max before the back panel 170 is damaged, that is, to form the F-D curve having a maximized impact energy absorption efficiency as shown in FIG. 16E.

Referring to FIGS. 16D and 17, in the case of the general crash box 300, it may be understood that the impact energy absorbing amount decreases previously to the permissible impingement amount of the bumper beam 150 in such a way that a damage of the back panel 170 occurs.

On the other hand, referring to FIG. 16B, when the respective grooves 137 and 147 of the outer support member 130 and the inner support member 140 are not formed according to Embodiment 2, since the deformation of the crash box 100 does not occur in the initial stage of a collision, the force applied to the member 160 is over the permissible strength. Referring to FIG. 16C, when the creases 134 and 144 are not formed on the vertical walls 131 and 141 of the outer support member 130 and the inner support member 140, since uniform compression and deformation do not occur, the impact energy absorbing amount is decreased relatively to Embodiment 1.

On the contrary, referring to FIGS. 15 and 16A, in the case of Embodiment 1, different from Embodiments 2 and 3, since the grooves 137 and 147 inducing the deformation in the initial stage of the collision and the creases 134 and 144 inducing the uniform compression and deformation are all included, the obtained impact energy absorbing amount is close to an ideal graph and a damage of the back panel 170 does not occur.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A crash box for an automobile, the crash box comprising:
a front plate member connected to a bumper beam;
a rear plate member connected to a member of an automobile, wherein the member of the automobile has a first cross section perpendicular to a center line of the automobile;
an outer support member connecting the front plate member and the rear plate member to each other, wherein the outer support member includes:
a first vertical wall connected to the front and rear plate members;
a pair of first connection portions bent from upper and lower ends of the first vertical wall toward the center line of the automobile, wherein each first connection portion has a first opening formed at a front end of each first connection portion and spacing each first connection portion apart from the front plate member; and a pair of first horizontal walls each extended from each first connection portion toward the center line of the automobile and each connected to the front and rear plate members, wherein the outer support member has a first open side which faces the center line of the automobile; and an inner support member connecting the front plate member and the rear plate member to each other and positioned adjacent to and outside the outer support member, wherein the inner support member includes:

a second vertical wall connected to the front and rear plate members and positioned adjacent to the first open side of the outer support member;

a pair of second connection portions bent from upper and lower ends of the second vertical wall toward the center line of the automobile, wherein each second connection portion has a second opening formed at a front end of each second connection portion and spacing each second connection portion apart from the front plate member; and a pair of second horizontal walls each extended from each second connection portion toward the center line of the automobile and each connected to the front and rear plate members, wherein the inner support member has a second open side which faces the center line of the automobile, wherein the pair of second horizontal walls of the inner support member are inclined relative to the center line of the automobile in a direction from a rear to a frontal center part of the automobile, wherein the first vertical wall, the pair of first horizontal walls, and the second vertical wall which are associated with together have a second cross section substantially the same as the first cross section where the inner and outer support member are connected to the rear plate member.

2. The crash box of claim 1, wherein the second vertical wall of the inner support member comprises one or more creases formed in a vertical direction.

3. The crash box of claim 1, wherein the inner support member comprises flanges each bent upwardly or downwardly from a front end of each second horizontal wall and each connected to the front plate member.

4. The crash box of claim 1, wherein the inclination is 15 to 60° based on a front and rear axis.

5. The crash box of claim 1, wherein the first vertical wall of the outer support member comprises one or more creases formed in a vertical direction.

6. The crash box of claim 1, wherein the front plate member comprises one or more creases formed inside in a vertical direction.

* * * * *